United States Patent [19]
Baker

[11] Patent Number: 6,101,756
[45] Date of Patent: Aug. 15, 2000

[54] FOLDING FISH AND ANIMAL CAPTURING NET APPARATUS

[76] Inventor: Monty R. Baker, 415 N. 9th St., Estherville, Iowa 51334

[21] Appl. No.: 09/369,877

[22] Filed: Aug. 9, 1999

Related U.S. Application Data

[63] Continuation-in-part of application No. 08/949,475, Oct. 14, 1997, Pat. No. 5,941,011.

[51] Int. Cl.⁷ ..................................................... A01K 77/00
[52] U.S. Cl. ................................................................ 43/12
[58] Field of Search .................................................. 43/12

[56] References Cited

U.S. PATENT DOCUMENTS

| | | |
|---|---|---|
| 708,797 | 9/1902 | Coffin . |
| 737,428 | 8/1903 | Lindsey et al. . |
| 1,036,222 | 8/1912 | Griffenberg . |
| 1,077,481 | 11/1913 | Levy . |
| 1,524,957 | 2/1925 | Sundberg .................................. 43/12 |
| 1,668,835 | 5/1928 | Allen ......................................... 43/12 |
| 2,515,685 | 7/1950 | Ash ............................................ 43/12 |
| 4,050,177 | 9/1977 | Gerritsen . |
| 5,131,178 | 7/1992 | Stoliar ....................................... 43/12 |
| 5,380,113 | 1/1995 | Boehm . |
| 5,471,778 | 12/1995 | Marfori . |
| 5,715,573 | 2/1998 | Holemans . |

FOREIGN PATENT DOCUMENTS 7883  of 1897  United Kingdom ....................... 43/12

*Primary Examiner*—Jack W. Lavinder
*Attorney, Agent, or Firm*—Richard C. Litman

[57] ABSTRACT

A folding fish and animal capturing net apparatus comprising three distinct hinges. An outer curvilinear lugged hinge is positioned in the frame. An inner lockable slotted hinge is provided for folding the frame in the manner of a resting butterfly's folded wings. A rod-shaped hinge in the handle is utilized for folding the handle between the folded sides of the frame.

8 Claims, 3 Drawing Sheets

FOLDING FISH AND ANIMAL CAPTURING NET APPARATUS

This application is a continuation-in part of Ser. No. 08/949,475 filed on Oct. 14, 1997, and now U.S. Pat. No. 5,941,011.

BACKGROUND OF THE INVENTION

1. Field of the Invention

The present invention relates generally to a folding capture net apparatus. More specifically, the invention is a folding fish or small animal capturing net apparatus which has unique and durable hinges.

2. Description of the Related Art

The related art of interest describes various hinges and landing nets, but none disclose the present invention with three different hinges. Folding articles, especially for landing heavy fish or capturing small animals, must have durable hinges to withstand the heavy stresses and strains encountered in these circumstances. The related art will be discussed in the order of perceived relevance to the present invention.

U.S. Pat. No. 5,380,113 issued on Jan. 10, 1995, to George L. Boehm describes a folding fish landing net with outer and inward hinge mechanisms comprising two J- or bow-shaped frame members. The outer hinge mechanism consists of chair-shaped link members which pivot on a pin and are attached to short tubes telescoped into the tubular frames by pop rivets. A spring in each outer link member biases the link members towards the lock up or open position of the frame. The inward hinge mechanism consists of two C-shaped hinge members which are locked in the open position of the frame members by a central stud attached by a threaded stud to the handle. The handle has to be pivoted toward the frame to permit the C-shaped frame members to pivot on a pin. The folding fish landing net is distinguishable for the structurally different folding elements.

U.S. Pat. No. 5,715,573 issued on Feb. 10, 1998, to Walter Holemans describes a self latching hinge for deploying spacecraft components such as solar panels, antenna booms, and sensors. Two solar panels are connected by embedded hinge housings which have two pistons, each piston under compression by surrounding springs. The four pistons are locked by link pins to a central latching link. The self latching hinge is distinguishable for its piston and compressive spring structure.

U.S. Pat. No. 1,524,957 issued on Feb. 3, 1925, to Gustaf E. Sundberg describes a folding landing net having four hinges in the resilient metal frame. The outer hinge of the frame is centered on a central axis aligned with the handle and consists of a one-way hinge (outward movement). Each outer hinge element has an outside ledge with a slotted gusset having a connecting bolt. The two side hinges have ears which rotate only one way to fold each half of the net towards the handle. The short handle is hinged to the frame with a spring lock and by a centered elongated arm from which extends a triangular piece having two short arms which pivot on the triangular connecting piece to collapse the frame sides toward each other. The folding landing net is distinguishable for its critical flexible net frame and the bulky net which must be compressed into three folds.

U.S. Pat. No. 737,428 issued on Aug. 25, 1903, to Theodore C. Lindsey et al. describes a folding fish scooping net having a frame which is bowl-shaped with a straight outer edge (a cord) and curved metal rod sides narrowing down to a straight bottom edge (solid wood cross-bar). The frame is tilted relative to the long handle at a right angle to catch minnows and even increased in angle similar to a hoe to catch crayfish. The handle consists of two parts connected by a ferrule. The net frame is releasably clamped by the cross-bar to the handle. The two side rods have angle ends which fit in slots in the cross-bar pivot on a pin to fold the net towards the handle. The scooping net is distinguishable for its cross-bar clamp and outer cord portion of the frame.

U.S. Pat. No. 1,036,223 issued on Aug. 20, 1912, to John W. Griffenberg describes a joint for oars consisting of a sleeved hinge joint which is slid back to permit a single link pivoting on the ends of the oar segments to pivot to fold the paddle portion over the handle portion. The oar joint is distinguishable for its required sleeve and a single link piece for folding.

U.S. Pat. No. 5,471,778 issued on Dec. 5, 1995, to Eddie Marfori describes a collapsible net assembly for catching animals and insects, and capable of rotatably closing the two support rods of the V-shaped net and folding over a telescoping handle. The net is removed before folding the device. The net assembly is distinguishable for its telescopic handle and the two-support rod frame.

U.S. Pat. No. 4,050,177 issued on Sep. 27, 1977, to Allen Gerritsen describes a foldable fish net. The fish net has two foldable arms pivoting back on a telescopic handle having two spring-urged telescoping sections. The foldable arms are connected by a flexible cord to form a triangular net. A wing nut and a bolt on the handle releases the tension on the arms when a push button is pressed. The arms and net are then folded and stored in a separate compartment in the handle. The foldable fish net is distinguishable for having two straight collapsible arms and a telescopic storage handle.

U.S. Pat. No. 708,797 issued on Sep. 9, 1902, to Thaddeus S. Coffin describes a folding landing net with four hinges forming a ring with four spring bars. The outer hinge permits the folding of the ring to an axis coincident with the telescopic handle. The side hinges have a pivot pin and a holding pin which when removed enables the ring to fold in half towards the handle. The inner hinge is uniquely constructed with an apertured doublesided element having four hooked catches to permit the dual projections on the proximate spring bars to unlatch and fold within the apertures.

U.S. Pat. No. 1,077,481 issued on Nov. 4, 1913, to Harry Levy describes a collapsible fish landing net holder comprising four spring steel segments attached by an outer pintle and two side sleeves attached to the tubular steel handle by arms on another pintle. The outer portion of the hoop is collapsed on its pintle, the four spring steel segments are collapsed by sliding within their sleeves, and the second pintle's arms are collapsed to insert the folded assembly including the net into the tubular handle. The collapsible fish landing net is distinguishable for its required pintles and sleeve joints.

None of the above inventions and patents, taken either singularly or in combination, is seen to describe the instant invention as claimed. Thus, a folding fish and animal capturing net apparatus solving the aforementioned problem of durability is desired.

SUMMARY OF THE INVENTION

The present invention provides a folding fish and animal capturing net having three durable and different hinges for folding purposes. The hinges are an outer curvilinear hinge and an inner lockable hinge for folding the frame in a manner analogous to the folded wings of a resting butterfly.

A rod-shaped hinge is utilized for folding the handle between the folded sides of the frame.

Accordingly, it is a principal object of the invention to provide a folding net apparatus having a rectangular-shaped outer frame and a triangular-shaped inner frame with three different hinges for capturing fish and small animals.

It is another object of the invention to provide a folding net apparatus having a curvilinear hinge for folding the outer portion of the frame.

It is a further object of the invention to provide a folding net apparatus having a lockable hinge for folding the inner portion of the frame.

Still another object of the invention is to provide a folding net apparatus having a rod-shaped hinge for the folding handle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
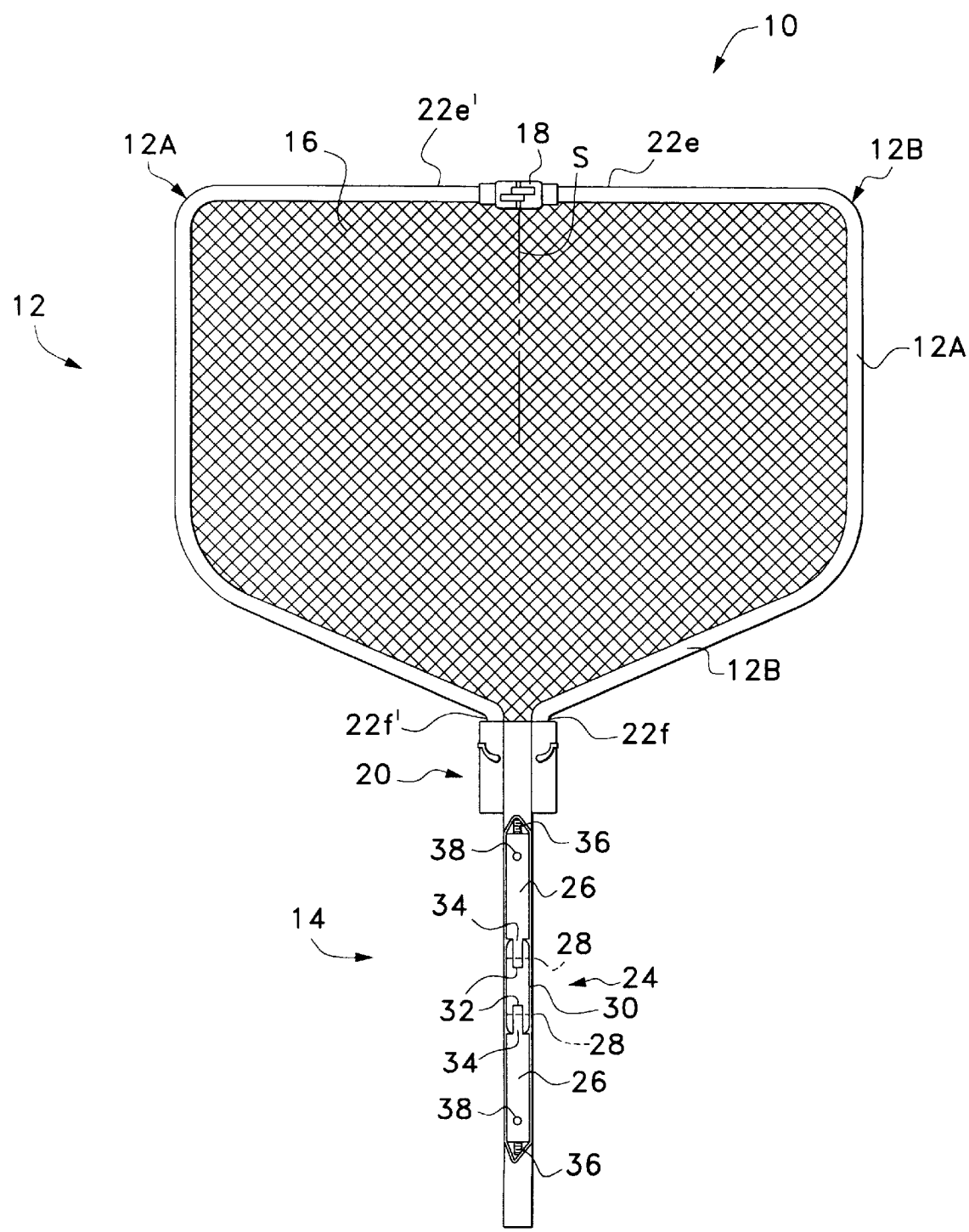
FIG. 1 is a plan view of a folding fish and animal capturing net apparatus with the handle partially in section according to the present invention.
Figure 2:
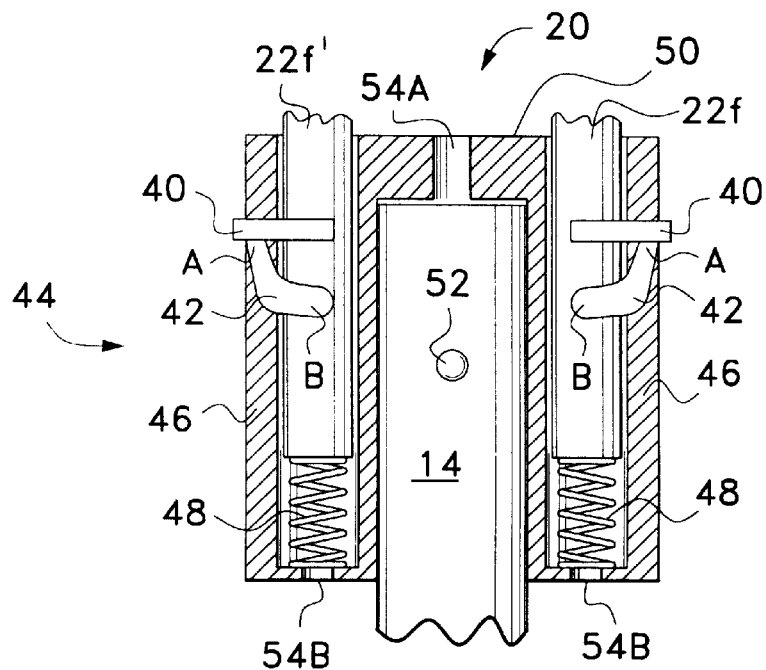
FIG. 2 is a schematic plan view of the locking hinge in the locked position to hold the frame open.
Figure 3:
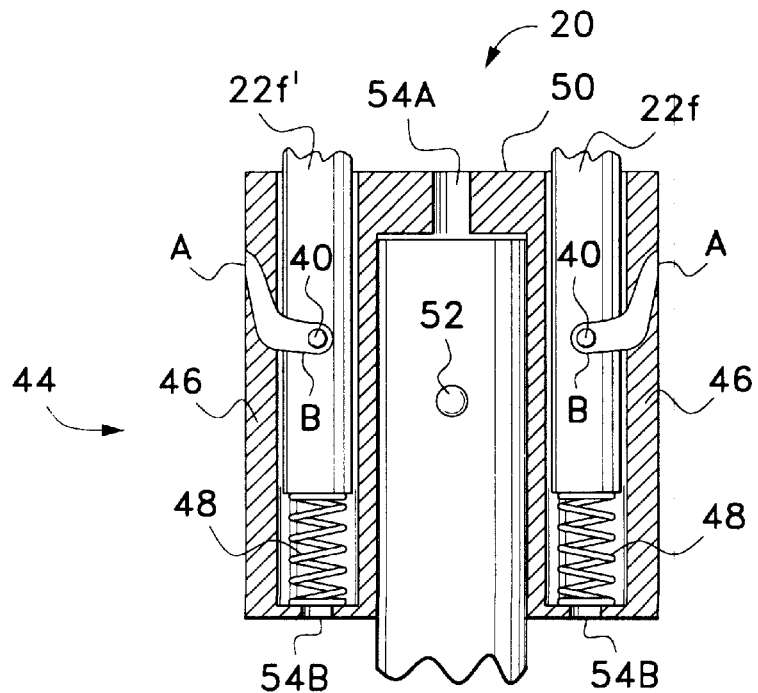
FIG. 3 is a schematic plan view of the locking hinge in the unlocked position to fold the frame.

The present invention is illustrated in FIG. 1 as a folding capture net 10 having a tubular metal frame 12 shaped as a rectangular outer frame portion 12a and a triangular inner frame portion 12b. The frame 12 has an axis of symmetrys extending through the apex of the triangular portion 12b and a midpoint of the opposing base, where a curvilinear hinge 18 is disposed. The axis of symmetry S divides frame 12 into a first frame member 12A and a second frame member 12B. Each frame member 12A,12B includes a distal end 22e,22e' and a proximal end 22f,22f'. A tubular handle 14 is attached to the frame 12 having a net 16. A curvilinear lugged hinge 18 is centered on the outer frame portion 12a. A lockable hinge 20 engages the proximal ends 22f,22f' of the frame 12 (FIGS. 2 and 3). A rod-shaped hinge 24 is inside the handle 14. The lugged hinge 18 and the lockable hinge 20 permit the folding of the frame 12 in the manner of the folded wings of a resting butterfly. The handle is then folded upon itself by the rod-shaped hinge 24 and inserted between the folded frame members 12A,12B. The unfolding process of the net 10 is also simple and secure.

In FIG. 1, the rod-shaped hinge 24 is shown in detail and forms a basis of aforementioned U.S. Pat. No. 5,941,011, which is incorporated herein by reference. The hinge 24 has two solid cylindrical extension elements 26 connected by pins 28 to a rotating solid central element 30 having slots 32 on each end which accept the centered flanges 34 of the extension elements 26. In effect, the three elements are connected in a tongue-in-groove configuration. The opposite end of each extension element 26 has a hook (not shown) for attaching a spring 36. Pins 38 secure the two extension elements 26 to the tubular handle 14.

Figure 4A:
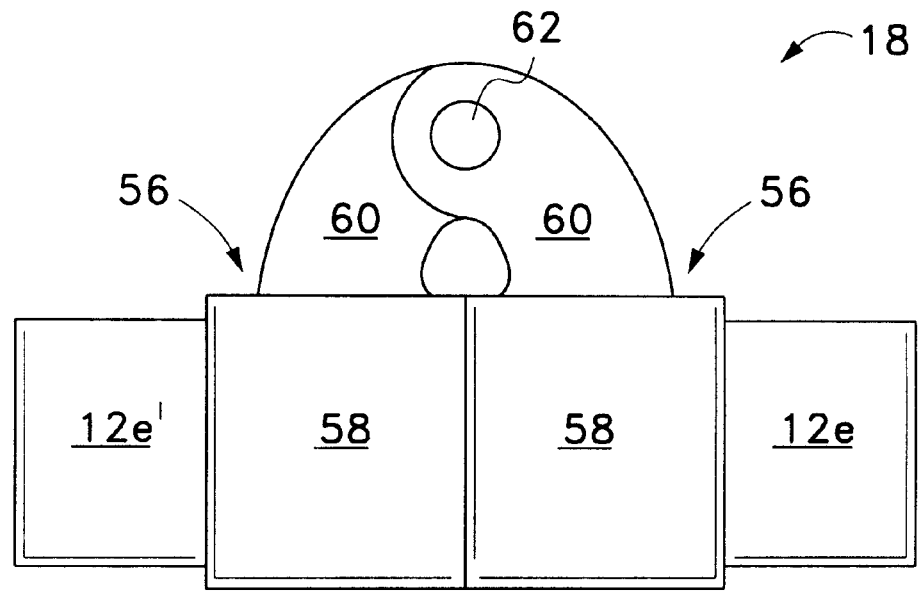
FIG. 4A is a side elevational view of the outer curvilinear lugged hinge in the closed position to hold the frame open.
Figure 4B:
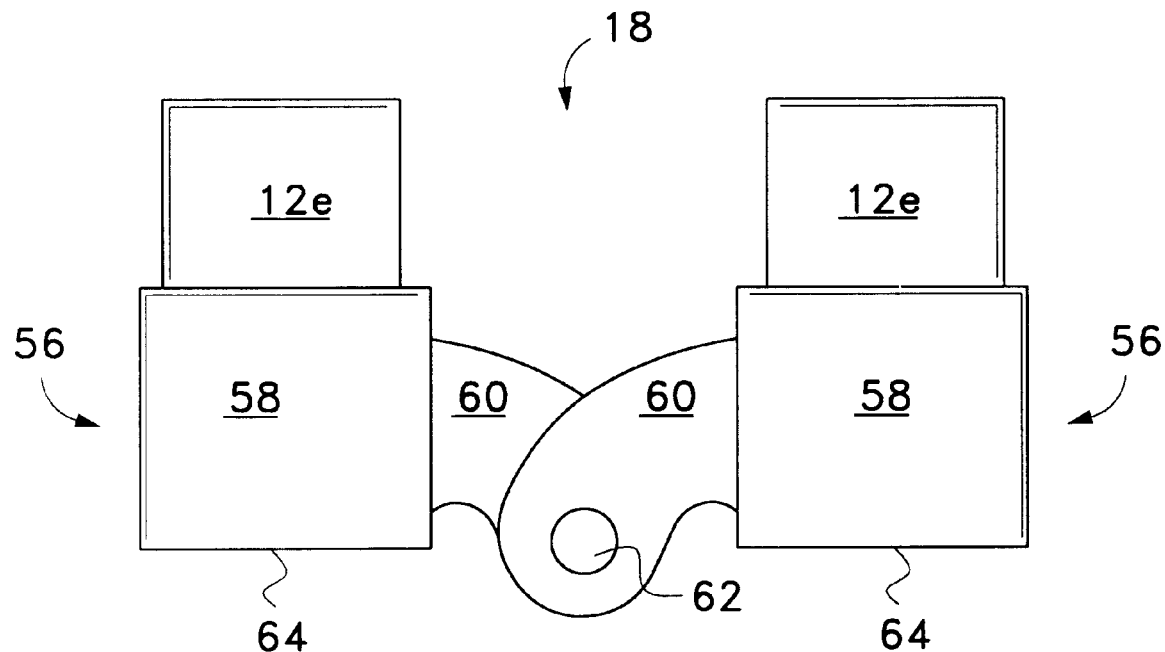
FIG. 4B is a side elevational view of the outer curvilinear lugged hinge in the open position to fold the frame.

Turning to FIGS. 2 and 3, the lockable inner hinge 20 is shown in schematic cross-sectional views attached to the proximal ends 22f,22f' of the frame 12. FIG. 2 depicts an unfolded condition with a pin 40 inserted in each of proximal ends 22f,22f' and extending out of the oval-shaped (cross-section) lockable inner hinge 20 at point A of the curved slot 42 in the oval shaped housing 44. The housing 44 has two side tubes 46 which contain compression springs 48 attached at their ends to the housing 44 and the proximal ends 22f,22f'. A central tube 50 in the housing 44 contains the handle 14 which is secured by a pin 52. Three drain holes 54 are provided in the housing 44 for the three tubes, with a drain hole 54A for the handle 14 on top and a drain hole 54B for each side tube 46 on the bottom. As the frame 12 is folded, the pins 40 automatically travel from point A to point B to hold the folded frame in position as shown in FIG. 3. Turning to FIGS. 4A and 4B, the curvilinear lugged outer hinge 18 is shown, respectively, for the unfolded and folded positions of the frame 12. The hinge 18 is coupled to each of the distal ends 22e,22e' of each frame member 12A,12B and has two cooperating sections 56, wherein each section has a tubular portion 58 and a lug 60. The lugs 60 are connected by a pivot pin 62. The tubular portions 58 have flat faces 64 which are closed and abut each other in the unfolded position of the frame 12.

Thus, a durable folding net apparatus has been shown for capturing fish and small animals. The net apparatus is light and compact in the folded position for either portage or storage with the net attached to the frame.

It is to be understood that the present invention is not limited to the embodiment described above, but encompasses any and all embodiments within the scope of the following claims.

I claim:

1. A folding fish and animal capturing net apparatus comprising:

a foldable tubular frame having an axis of symmetry dividing said frame into a first frame member and a second frame member, each said frame member having a proximal end and a distal end;

a net attached to and circumscribed by said tubular frame;

a curvilinear lugged hinge coupled to the distal end of each said frame member;

a lockable hinge coupled to the proximal end of each said frame member, said lockable hinge including a housing containing a central tube and two side tubes, the proximal end of each said frame member being secured within each of said side tubes;

a tubular handle having one end secured within the central tube of said lockable hinge housing; and a rod-shaped hinge positioned inside said tubular handle for folding the handle upon itself and between the folded net and frame.

2. The folding fish and animal capturing net apparatus according to claim 1, wherein the frame comprises a rectangularly shaped outer frame and a triangularly shaped inner frame.

3. The folding fish and animal capturing net apparatus according to claim 1, wherein the frame comprises a circular frame.

4. The folding fish and animal capturing net apparatus according to claim 1, wherein said curvilinear lugged outer hinge comprises two identical cooperating sections, each section comprising a tubular portion connected to the frame and a lug extending from said tubular portion, and wherein said curvilinear lugged hinge further comprises a pivot pin connecting each said lug.

5. The folding fish and animal capturing net apparatus according to claim 1, wherein said rod-shaped hinge comprises two cylindrically shaped extension elements hinged to a central rod element in a tongue-in-groove configuration.

6. The folding fish and animal capturing net apparatus according to claim 1, wherein each of said side tubes has a curved slot adapted to confine a pin attached to the proximal end of each said frame member.

7. The folding fish and animal capturing net apparatus according to claim 1, wherein each of said side tubes has a compression spring having a first end and a second end, the first end being attached to the side tube and the second end to the proximal end of each said frame member.

8. The folding fish and animal capturing net apparatus according to claim 7, wherein the housing has a drain hole in the central tube above the handle and in each side tube below the compression spring.

\* \* \* \* \*